Dec. 10, 1963   G. H. VAN KUREN   3,113,395
ANIMAL TRAP
Filed June 9, 1961
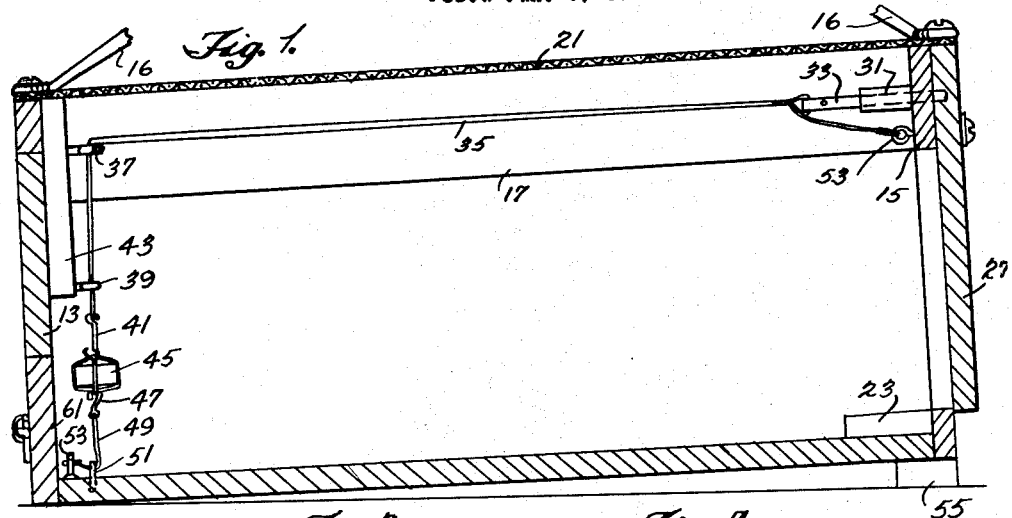
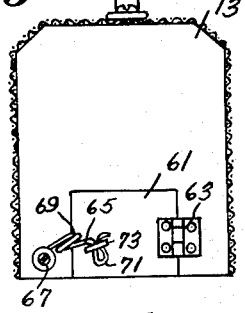
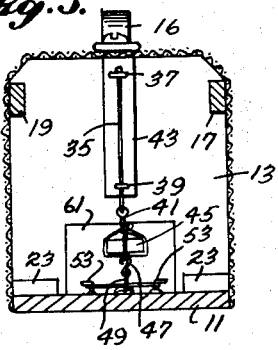
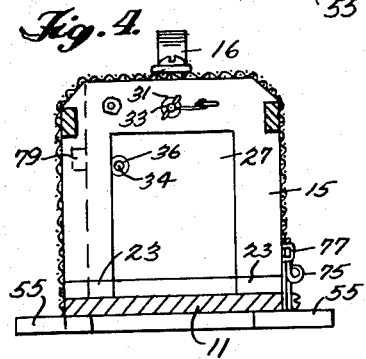
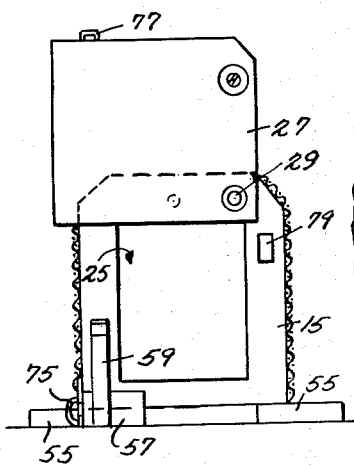
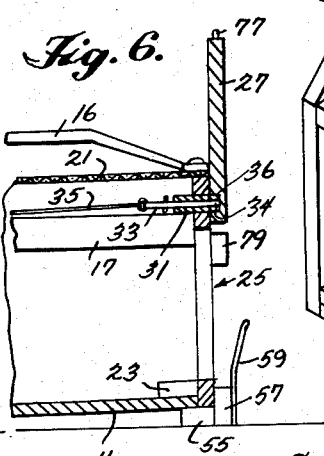
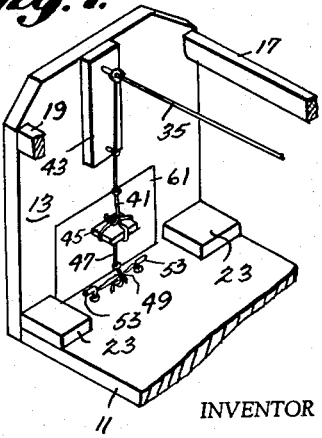
INVENTOR
GEORGE H. VAN KUREN
BY
Lane & Aitken
ATTORNEYS

United States Patent Office 3,113,395
Patented Dec. 10, 1963

3,113,395
ANIMAL TRAP
George H. Van Kuren, 2421 Pauline, New Orleans, La.
Filed June 9, 1961, Ser. No. 116,098
2 Claims. (Cl. 43—61)

This invention relates to animal entrapment, and more particularly to an animal trap of the type which imprisons animals without harming them.

Some urban areas teem with semi-wild cats commonly referred to as "alley cats." These alley cats are highly undesirable because they are a menace to birds, are noisy, particularly at night, are destructive of property, and can be dangerous. The trap of the present invention eliminates this nuisance by entrapping the cats but without harming them. Although the invention was conceived primarily for the purpose of entrapping cats, it can be used for entrapping alive and unharmed almost any kind of animal, large or small, simply by selecting the dimensions and materials of the trap to fit the animal desired to be caught. For example, the present invention can be used to entrap wild dogs, which are often a problem in rural areas.

Prior to the present invention, numerous traps which imprison the prey without harming it were known. These traps of the prior art generally comprise an enclosure with an opening through which the animal to be trapped may enter, lured by bait within. After the animal has entered the enclosure, the animal is supposed to actuate a trigger mechanism which releases a door to close the opening, thus entrapping the animal. However, these traps are inferior to the trap of the present invention because the trigger mechanisms are not as sensitive as the trigger mechanism in the trap of the present invention. Moreover, the door in the traps of the prior art often jams and does not close properly after it has been released by the trigger mechanism, and the animal is permitted to escape. The present invention achieves a much more precise closure of the door, making for substantially more reliable operation of the trap.

Accordingly, it is a principal object of the present invention to provide an improved animal trap.

Another object of the present invention is to provide an animal trap with a more efficient trigger mechanism.

A further object of the present invention is to provide a more reliable animal trap of the imprisoning type.

Many other objects and advantages of the present invention will become readily apparent as the following description of the invention unfolds and when taken in conjunction with the drawings, wherein:

FIG. 1 is a cross-sectional view in elevation of the trap taken lengthwise through the trap;

FIG. 2 is a view in elevation of the rear of the trap;

FIG. 3 is a cross-sectional view in elevation taken crosswise through the trap looking towards the rear of the trap and illustrating the details of how the bait is mounted in the trap;

FIG. 4 is a cross-sectional view in elevation of the trap taken crosswise through the trap looking toward the front of the trap;

FIG. 5 is a view in elevation of the front of the trap with the door of the trap in its raised or set position;

FIG. 6 is a fragmentary cross-sectional view in elevation of the front end of the trap taken lengthwise through the trap with the door of the trap in the raised or set position; and FIG. 7 is a fragmentary view in perspective of part of the trap illustrating the details of how the bait is mounted in the trap.

As shown in the drawings, the trap comprises a rectangularly-shaped bottom wall or floor 11, on which there is mounted a front wall 15 and a rear wall 13. The sides of the front and rear walls 15 and 13 abut against the ends of the floor 11 with the bottoms of the front and rear walls 15 and 13 flush with the bottom surface of the floor 11. The front and rear walls 15 and 13 are mounted perpendicularly to the plane of the floor 11. The contours of the front and rear walls 15 and 13 are identical, being generally rectangular in shape with the upper corners bevelled off. Cross beams 17 and 19 run between the opposing upper sides of the front and rear walls 15 and 13 just beneath the bevelled corners. A hardware-cloth covering 21 is stretched over the top and sides of the structure and attached to the top and side edges of the front and rear walls 15 and 13. The floor 11, together with the front and rear walls 15 and 13 and the hardware-cloth covering 21 thus define an enclosure or cage. Blocks 23 are provided at the corners of the cage between the floor 11 and the end walls 15 and 13 to increase the strength and rigidity of the structure. A handle 16 is attached to the top of the enclosure so that it may be conveniently carried.

The front wall 15 is provided with an opening 25 through which the animal to be trapped can enter the enclosure. A door 27 is pivotally mounted for sliding movement on the front wall 15 by means of a pivot 29 so that the door 27 can be swung open or shut by sliding it on the outside surface of the front wall 15. The door 27 closes the opening 25 when the door 27 is in the position shown in FIG. 1. The pivot 29 is positioned on the wall 15 over the upper right hand corner of the opening 25 and on the door 27 relative to the center of gravity of the door 27 so that when the door 27 is in the raised or set position, as shown in FIGS. 5 and 6, the force of gravity upon the door 27 will tend to swing the door 27 about the pivot 29 and bring it into the closed position, in which the door 27 closes the opening 25. A sleeve 31 is mounted in a hole through the front wall 15, and the sleeve 31 defines a small opening through the front wall 15, through which a rod 33 is slidable. The opening defined by the sleeve 31 makes a loose sliding fit with the rod 33. When the door 27 is in its raised or set position as shown in FIGS. 5 and 6, a hole 34 defined in the back side of the door 27 will be aligned with the opening defined by the sleeve 31. The hole 34 is approximately the same size as the opening defined by the sleeve 31 so that the rod 33 will just fit into the hole 34 when the rod 33 is slid through the sleeve 31, as is best illustrated in FIG. 6. When the rod 33 is slid through the sleeve 31 and into the opening 34 as shown in FIG. 6, the rod 33 will prevent the door from being swung about the pivot 29 by the force of gravity and the door 27 will be maintained in its set or raised position. The hole 34 is defined by a sleeve 36 embedded in the rear surface of the door 27 and does not pass through the door 27, but is just made deep enough so that the rod 33 will securely hold the door 27 in its set position and a minimum amount of force will be required to pull the rod out from the hole 34 to release the door and allow it to be swung closed by the force of gravity. A wire 35 is attached to the end of the rod 33. The wire 35 extends to the rear end of the trap where it passes through the eye of an eye screw 37 and then down through the eye of an eye screw 39 to a hook 41 which is suspended by the wire 35. The eye screws 37 and 39 are vertically aligned and are screwed into an oblong block 43 fastened to the back wall 13. The eye of the screw 39 is made just large enough so that the wire 35 will pass freely therethrough. Suspended from the hook 41 is a piece of bait 45. A second hook 47 is attached to the bail 45 from below. The hook 47 is attached to a wire 49 which runs from the hook 47 down through a staple 51 fastened to the floor 11 directly beneath the piece of bait 45. The wire 49, after passing through the staple 51, is wrapped around a pair of hooks 53 and firmly secured thereto. The wire 49 is adjusted so that it and the wire 35 are made taut with just less than enough tension to pull the rod 33 out from the hole 34 when the door 27 is in its raised or set position. The wire 49, together with the hook 47 and the hooks 53, secures the bait and wire 35 against axial movement along the wire 35 towards the rod 33. Because of this securing any movement of the bait will cause axial movement of the wire 35 in the direction away from the rod 33 and the trap will be sprung. Because the eye in the eye screw 39 is just large enough to accommodate the wire 35, any movement of the bait 45, when the door is in its set position, will cause a substantial increase in tension on the wire 35 and thus cause the rod 33 to be pulled out from the hole 34 and release the door 27. The force of gravity will thereupon cause the door 27 to swing shut, imprisoning the animal which caused the bait 45 to move.

With this arrangement the weight of the bait 45 tends to pull the rod 33 out from the hole 34 so that only a small additional force is needed to actually pull the rod 33 out of the hole 34 to release the door 27, allowing it to swing closed under the force of gravity. The weight of the bait may be selected so that it provides just less than enough pull on the line 35 to pull the rod 33 out from the hole 34 or additional weights may be added to the line 35 below the eye screw 37 so that the combined pull on the line 35 by the bait 45 and the additional weights is just less than enough to pull the rod 35 out from the hole 34. Thus there is provided a hair trigger mechanism in which a very small force will be effective in releasing the door 27, no matter what the size of the trap and the animal being trapped. For example, if the door 27 were of such size and weight that a hundred pounds were necessary to pull the rod out of the hole 34, as might be the case in a large animal trap, and the bait 45 weighed 95 lbs., then weights could be added to the line 35 below the eye screw 37 until the pull on the line 35 was just on the verge of pulling the rod out from the hole 35. When this point was reached, a small mouse climbing on the line 35 would actually trigger the trap because the body weight of the mouse would be sufficient to upset the delicate balancing of forces that had been attained. Of course in a large animal trap a trigger mechanism so highly sensitive would probably not be desirable, but the example illustrates the hair trigger principle of the structure.

The most sensitive operation is achieved when the distance between the bait 45 and the eye screw 39 is substantially the same as the distance from the bait to the staple 51. It will be observed that it would be possible to operate the trap without the eye screw 39, as movement of the bait 45 would still cause increased tensioning of the wire 35 and thus release the door 27. However, the eye screw 39 increases the sensitivity of the trigger mechanism in that with the eye screw 39 a smaller movement of the bait 45 will cause greater increased tension to be applied to the wire 35.

The wire 35 also extends from the end of the rod 33 to an eye screw 53 where it is attached, so that if the rod 33 is pulled all the way out of the sleeve 31 it will hang from the eye screw 53. This feature maintains the wire 35 in a generally extended configuration to prevent it from being kinked or damaged, and makes the rod 33 conveniently available for resetting the door 27 in its raised position.

Blocks 55 are attached to the under side of the floor 11 and the bottom edge of the front wall 15 flush with the outside surface of the wall 15 so that when the trap is placed on a horizontal surface the front of the trap structure will be slightly raised. This feature causes the front wall 15 to be inclined with respect to vertical. Because the front wall 15 is inclined in this manner, the door 27, instead of having a purely free fall, will slide on the very steeply inclined outside surface of the front wall 15 when it is swung by the force of gravity about the pivot 29 after the door has been released. This feature makes for better and more reliable closing action of the door because it counteracts an aerodynamic force which tends to push the door 27 away from the wall 15 as the door 27 swings closed. This aerodynamic force is a slight pressure which tends to be built up between the door 27 and the wall 15 tending to push the door 27 away from the wall 15. Because the door is slightly inclined, this aerodynamic force will not push the door 27 out of sliding contact with the wall 15 and a precise closure action is obtained. Thus there is provided positive, complete and instantaneous closing of the door 27 each and every time it is released. The blocks 55 also serve to stabilize the structure and prevent it from being tipped over even though the trapped animal thrashes violently about upon discovering that it is trapped. When the door 27 swings shut it comes to rest against a block 57, which is attached to the bottom of the outside surface of the wall 15 and to the front edge of one of the blocks 55. The bottom side of the block 57 is made flush with the bottom of the block 55 to provide part of the supporting surface for the structure. When the door 27 is swung closed by the force of gravity, the block 57 stops the motion of the door 27 when it gets to its closed position. A steel retaining slat 59 is fastened to the block 57 and extends upward therefrom in a direction generally parallel to the front wall 15. When the door 27 is released, it swings to its closed position between the slat 59 and the front wall 15. The door 27 just fits between the front wall 15 and the slat 59 when the door 27 is in its closed position. The upper end of the slat 59 is bent slightly outward so as to provide substantial clearance for the entry of the door 27 between the slat 59 and the wall 15 when the door 27 swings shut. The slat 59 prevents the door 27 from being sprung outwardly by the trapped animal after the door 27 has swung shut.

A door 61 is provided in the back wall 13, and the door 61 is mounted on the wall 13 by means of a hinge 63 which permits the door to swing open outwardly. The door 61 permits easy access to the bait of the trap and facilitates mounting the bait and adjustment of the tension in the wires 49 and 35.

A stiff springy wire 65 is pivotally mounted on the back wall 13 on a pivot axis provided by a screw 67. The wire 65 is formed into a loop 69 in its middle and a U-shaped bend 71 at its end. The U-shaped bend 71 fits into a staple 73 fastened to the door 61 and latches the door 61 shut. Because the wire 65 is formed into the loop 69 and the U-shaped bend 71, it will operate as a spring to hold the U-shaped bend 71 in the staple 73. A positive force must be applied to the wire 65 overcoming the spring action to remove the U-shaped bend 71 from the staple 73 unlatching the door 61. Thus the door 61 is securely latched by means of the stiff springy wire 65 and the staple 73. A stiff springy wire 75 pivotally mounted on the block 57 and shaped in the same manner as the wire 65 is also provided to latch the door 27 closed through a staple 77 provided in the side of the door 27. The wire 75 operates as a spring in the same manner as the wire 65 and securely holds the door 27 closed when its U-shaped bend is inserted through the staple 77. A block 79 is fastened to the front side of the wall 15 against which the pivotable door 27 may be rested in an open position. When the door 27 rests against the block 79 its top surface will engage the block 79 and the force of gravity will not be tending to swing the door 27 closed but will maintain it in its open position against the block 79.

Instead of using the wires 35 and 49, other kinds of lines may be used, such as cord or string. Also a single line may be used with the bait attached thereto between its ends instead of using the two separate lines 35 and 49. Moreover, the covering material may be wire screening or other equivalent material instead of hardware-cloth. These and many other modifications may be made to the above described specific embodiment without departing from the spirit and scope of the invention.

What is claimed is:

1. An animal tray adapted to be baited comprising: wall means defining an enclosure having an opening, a door for said opening movable between an opened position and a closed position, release means within said enclosure to hold said door in its opened position and to release said door when pulled with a predetermined force for movement to said closed position, anchor means within said enclosure and fixed to said wall means at a location remote from said release means, bait suspending means within said enclosure at a point spaced from said wall means and said anchor means, said bait suspending means also being spaced from said opening by an amount to be accessible to an animal only after it is entirely within said enclosure, a line within said enclosure having a portion adapted to extend between said bait suspending means and said release means and a portion to extend between said bait suspending means and said anchor means, said line being adjustably secured to said anchor means for making said line taut and said line portions in alignment with each other and with said bait suspending means, and means within and fixed relative to said enclosure for holding the portion of said line extending to said release means against lateral movement, said last mentioned means being spaced from said bait suspending means by substantially the same amount as said bait suspending means is spaced from said anchor means whereby movement of the bait suspending means from said point in substantially all directions results in increased tension in said line to pull said release means.

2. A trap as recited in claim 1 in which said means for holding said line against lateral movement includes an eye around said line just large enough to permit free movement of said line through said eye.

References Cited in the file of this patent

UNITED STATES PATENTS

| 1,326,662 | Kampfe | Dec. 30, 1919 |
| 1,793,773 | Brown | Feb. 24, 1931 |
| 2,087,646 | Houghton | July 20, 1937 |

FOREIGN PATENTS

| 6,734 | Great Britain | Apr. 4, 1894 |